June 23, 1970  K. F. FERGUSON  3,516,641
FORKLIFT TRUCK AND PUSH-PULL UNIT THEREFOR
Filed Nov. 13, 1967  7 Sheets-Sheet 1

FIG. 1.

INVENTOR.
KENNETH F. FERGUSON

By His Attorneys

HARRIS, KIECH, RUSSELL & KERN

FIG. 2.

INVENTOR.
KENNETH F. FERGUSON
By His Attorneys
HARRIS, KIECH, RUSSELL & KERN

June 23, 1970     K. F. FERGUSON     3,516,641
FORKLIFT TRUCK AND PUSH-PULL UNIT THEREFOR
Filed Nov. 13, 1967     7 Sheets-Sheet 3

INVENTOR
KENNETH F. FERGUSON
By His Attorneys
HARRIS, KIECH, RUSSELL & KERN

United States Patent Office 3,516,641
Patented June 23, 1970

3,516,641
FORKLIFT TRUCK AND PUSH-PULL UNIT THEREFOR
Kenneth F. Ferguson, Placentia, Calif., assignor to Hunt-Wesson Foods, Inc., Fullerton, Calif., a corporation of Delaware
Filed Nov. 13, 1967, Ser. No. 682,024
Int. Cl. B66f 3/22; B60p 1/00
U.S. Cl. 254—122      10 Claims

ABSTRACT OF THE DISCLOSURE

A forklift truck having a push-pull unit combining high capacity and a long reach with high strength. A push-pull linkage system which includes a push-pull link and a four-bar guide linkage for guiding the forward end of the push-pull link toward and away from the truck along a substantially straight-line path substantially parallel to the upper surface of the fork. A four-bar lazy-tongs actuating linkage interconnects the push-pull link and the guide linkage and serves to move the free end of the push-pull link toward and away from the truck along the substantially straight-line path mentioned. A hydraulic cylinder forms one of the links of the actuating linkage and another hydraulic cylinder extends across one diagonal thereof. A push-pull assembly is connected to the free end of the push-pull link and a four-bar parallel-motion linkage interconnects the push-pull assembly and the guide linkage to maintain the push-pull assembly parallel to itself as it is moved back and forth substantially parallel to the upper surface of the fork. The fork includes tines pivotally mounted on a tine-supporting structure in such a way that they can be removed readily for replacement if necessary.

BACKGROUND OF THE INVENTION

It is conventional to equip a forklift truck with a push-pull unit capable of pushing a load off the fork onto a suitable support, or of pulling the load from such support onto the fork. For example, the push-pull unit may be used with a palletized load to deposit it on a suitable support, such as a floor, another palletized load, or the like, or to pull a palletized load from its support onto the fork. A palletized load for handling by a forklift truck and push-pull unit of the type to which the invention relates may, for example, comprise a stack of shipping cartons on a pallet having the form of a flat sheet formed of corrugated paper, or other suitable material. The push-pull unit is provided with a push-pull means which engages the stack on the pallet when pushing the load off the fork, and which grips an exposed edge of the pallet when pulling the pallet and the stack thereon onto the fork.

As a matter of convenience in disclosing the invention, it will be considered herein in connection with a forklift truck having a push-pull unit of the foregoing general type.

Any push-pull unit of the type under consideration must have a "reach" at least equal to the depth of the palletized load to be handled. In other words, the push-pull unit must be capable of expanding and contracting, lengthwise of the fork, through a range at least equal to the horizontal dimension of the palletized load in the push-pull direction. Thus, the necessary reach may be several feet.

In the past, such a reach has frequently been achieved by incorporating in the push-pull unit a lazy-tongs composed of a plurality of four-bar linkages. Such multi-linkage lazy tongs have proven incapable of withstanding the forces acting thereon when handling heavy palletized loads, which can amount to several tons. Breakage of various bars of such multi-linkage lazy tongs is a common occurrence. Nevertheless, push-pull units of this type have been in widespread use because of their long reach and their compactness when contracted.

SUMMARY AND OBJECTS OF INVENTION

With the foregoing as background, a primary object of the invention is to provide a push-pull linkage system which combines a long reach, and compactness in its contracted condition, with a sturdy construction capable of withstanding the forces incident to handling heavy loads.

More particularly, an important object is to provide a push-pull linkage system which, while generally of the lazy tongs type, utilizes a minimum number of linkages composed of sturdy links or bars capable of withstanding the forces required to push heavy loads from or pull heavy loads onto a fork of a lift truck.

Still more specifically, a fundamental object of the invention is to provide a push-pull unit which includes a push-pull means movable toward and away from a support by a push-pull linkage system which includes three basic linkages, viz., a four-bar guide linkage mounted on the support for guiding the push-pull means along a substantially straight-line path, a four-bar actuating linkage of the lazy-tongs type connected to the guide linkage for moving the push-pull means toward and away from the support on its substantially straight-line path, and a four-bar parallel-motion linkage interconnecting the push-pull means and the guide linkage for maintaining the push-pull means parallel to itself as it is moved back and forth along its substantially straight-line path.

With the foregoing three basic linkages, a push-pull linkage system which has a long reach and which is compact when contracted is achieved. Also, the various elements of the three basic linkages may be of sturdy construction to withstand the forces incident to handling very heavy loads.

An important object of the invention is to provide a push-pull linkage system which includes a push-pull link common to the guide linkage, the actuating linkage and the parallel-motion linkage and having a free end connected to the push-pull means and movable along a substantially straight-line path substantially parallel to the upper surface of the fork.

Another object is to provide a push-pull linkage system wherein the guide linkage includes generally parallel first and second guide links pivotally connected to the support in laterally spaced relation and pivotally connected to the other end of the push-pull link in laterally spaced relation, the guide linkage also including the portions of the support and the push-pull link lying between the points of pivotal connection of the first and second guide links thereto.

Another object is to provide a push-pull linkage system wherein the actuating linkage includes a first actuating link pivotally connected at one end to the push-pull link intermediate the ends of the latter, a second actuating link pivotally connected at one end to the second guide link intermediate the ends of the latter, means pivotally interconnecting the other ends of the first and second actuating links, the first and second actuating links cooperating with the push-pull link and the second guide link to form the actuating linkage. A related object is to provide an extensible and contractible actuator pivotally connected at one end to the actuating linkage adjacent the corner thereof formed by the first and second actuating links, and pivotally connected at its other end to the actuating linkage adjacent the diagonally opposite corner therof, whereby extension and contraction of the actuator respectively result in contraction and extension of the actuating linkage to move the free end of the push-pull link respectively toward and away from the support along its substantially straight-line path. Another object in this connection is to provide a second actuating link which comprises a second extensible and contractible actuator and wherein the two actuators operate sequentially.

Still another object is to provide a push-pull linkage the push-pull link and a second push-pull link generally parallel thereto, one end of the second push-pull link being pivotally connected to the push-pull means at a point spaced laterally from the free end of the first-mentioned push-pull link, and the other end of the second push-pull link being pivotally connected to the first guide link at a point spaced laterally from the other end of the first-mentioned push-pull link.

Another and important object of the invention is to provide a lift truck including a fork having an improved tine construction and tine mounting system. More particularly, an object in this connection is to provide a forklift truck which includes: a tine supporting structure; laterally spaced tines projecting forwardly from the tine supporting structure and being tapered forwardly in vertical planes substantially from their rearward ends to their forward ends; upstanding mounting brackets respectively connected to the tines at the rearward ends thereof; transverse horizontal pivot means pivotally connecting the upper ends of the mounting brackets to the tine supporting structure; and abutment means forming part of the tine supporting structure and located rearwardly of the mounting brackets adjacent the lower ends thereof and engageable by the mounting brackets, the action of gravity on the tines causing the mounting brackets to seat against the abutment means. Still another object is to provide a forklift truck of the foregoing nature wherein the pivot means includes a single transverse horizontal shaft pivotally connecting the upper ends of all of the mounting brackets to the tine supporting structure.

The foregoing objects, advantages, features and results of the present invention, together with various other objects, advantages, features and results thereof which will be evident to those skilled in the art in the light of this disclosure, may be achieved with the exemplary embodiment of the invention illustrated in the accompanying drawings and described in detail hereinafter.

DETAILED DESCRIPTION OF PREFERRED EMBODIMENT OF INVENTION

Figure 1:
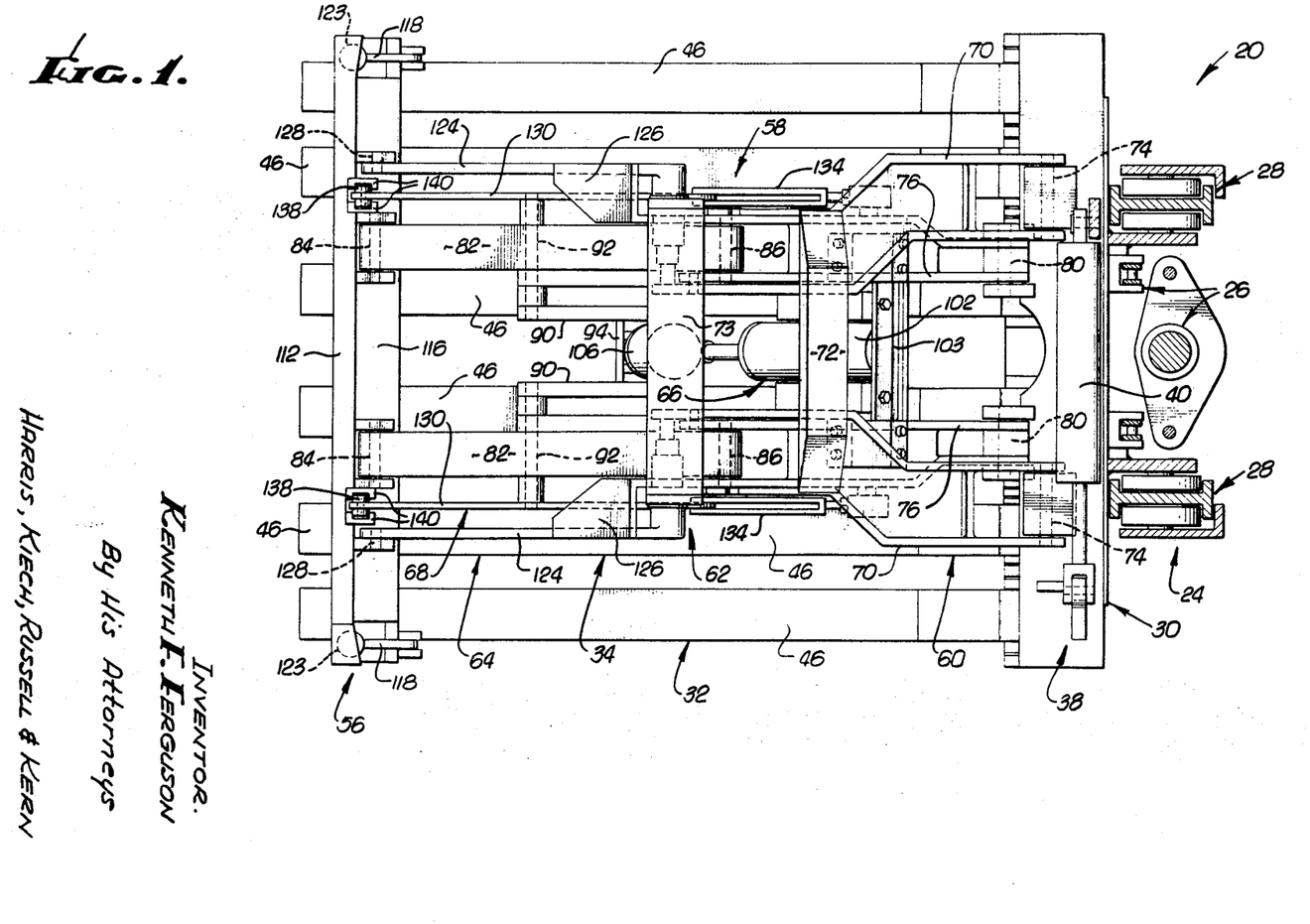
FIG. 1 is a plan view of a lift-truck fork and push-pull unit of the invention, a push-pull linkage system of the push-pull unit being shown in its fully extended condition.
Figure 2:
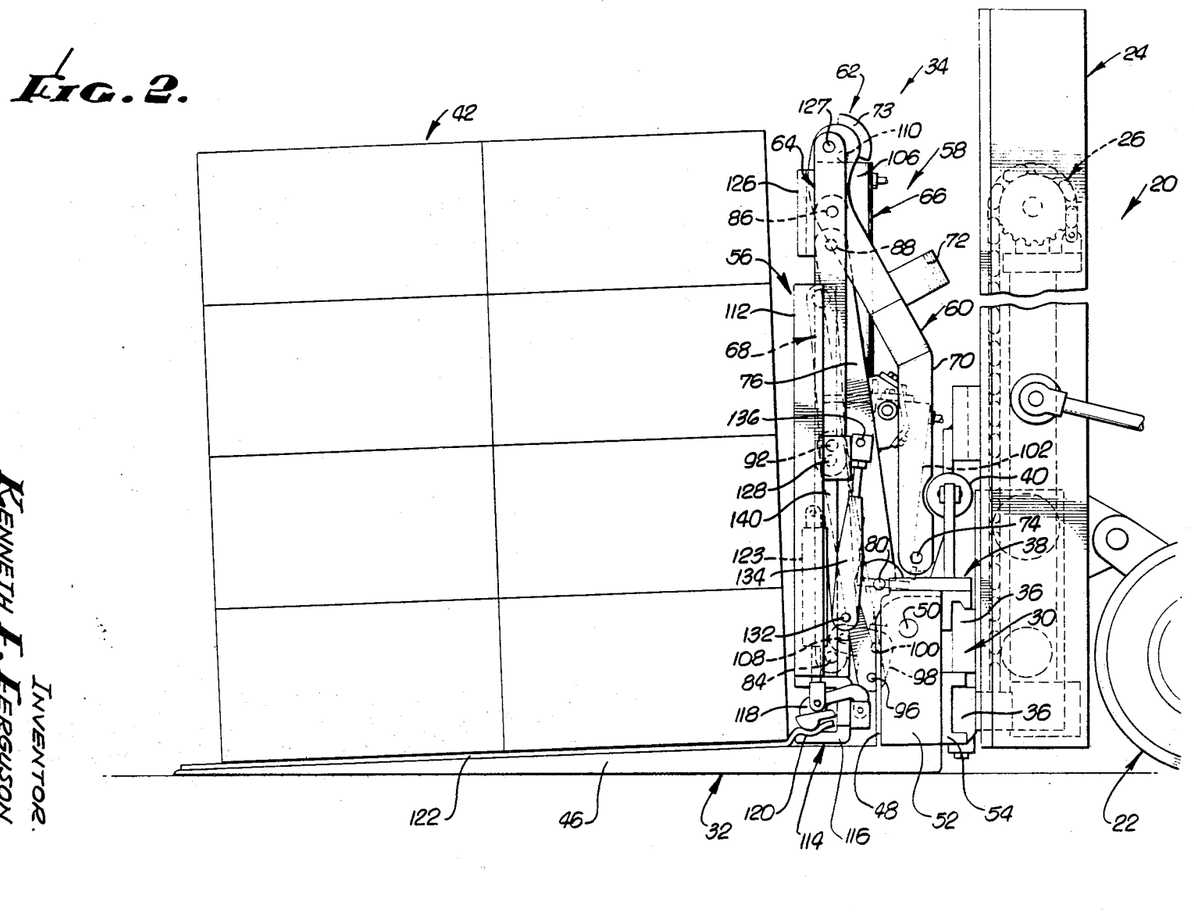
FIG. 2 is a side elevational view of the fork and push-pull unit showing the push-pull linkage system in its contracted condition.
Figure 3:
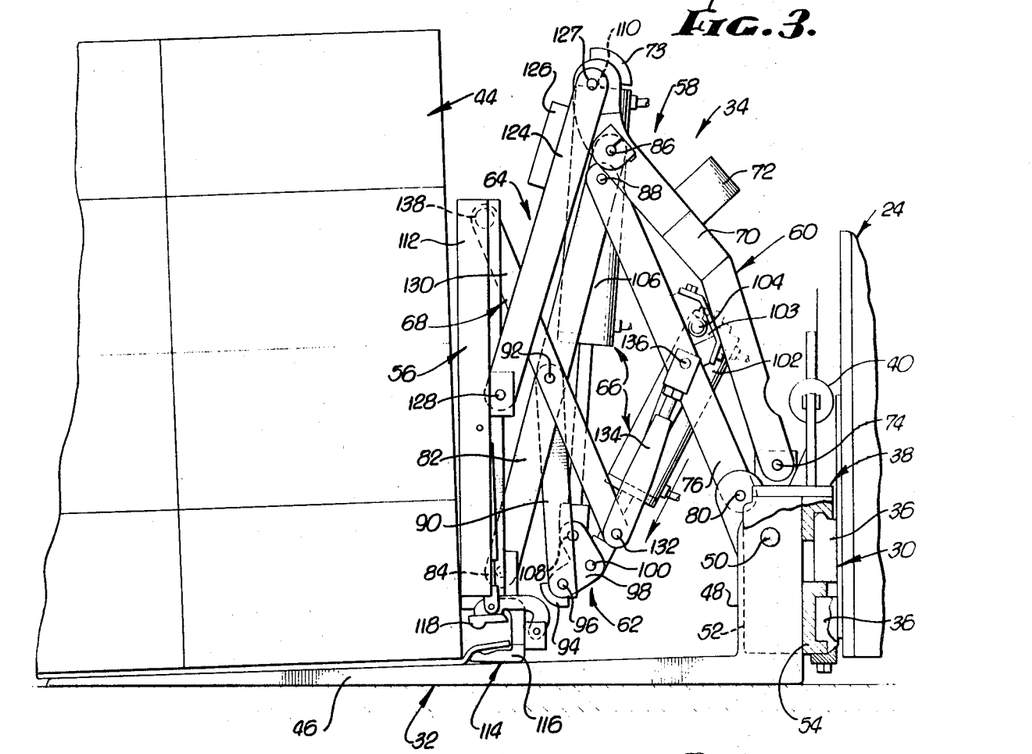
FIG. 3 is a view similar to FIG. 2, but showing the push-pull linkage system in a partially extended condition and in the process of being further extended.
Figure 4:
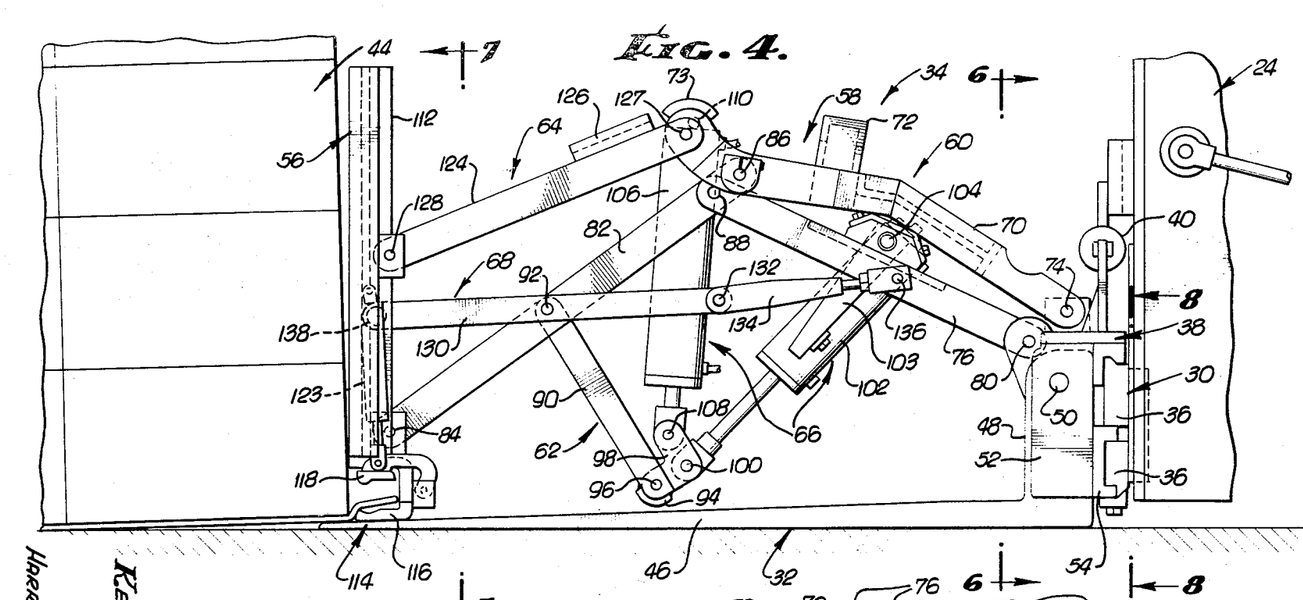
FIG. 4 is a view similar to FIGS. 2 and 3, but showing the push-pull linkage system in its fully extended condition, FIG. 4 corresponding to FIG. 1 in this respect.

Referring initially to FIGS. 1 to 5 of the drawings, a forklift truck embodying the present invention is designated generally therein by the numeral 20 and includes a suitable conventional truck 22 a fragment of the front end of which is visible in FIG. 2. The truck 22 is provided at its forward end with the usual mast 24 equipped with a suitable lifting means 26 for moving upwardly and downwardly, along laterally spaced, upright track means 28, FIG. 1, a mounting structure 30 for a forwardly-extending fork 32 and a forwardly-extensible and rearwardly-contractible push-pull unit 34. As best shown in FIG. 3 of the drawings, the mounting structure 30 includes laterally or transversely extending, horizontal track means 36 suitably connected to the lifting means 26 so as to be upwardly and downwardly movable thereby. The mounting structure 30 also includes a support or supporting structure 38 for the fork 32 and the push-pull unit 34 which is movable laterally or transversely along the track means 36. A transverse hydraulic motor 40 of the reciprocating type suitably connected at one end to the track means 36 and at its other end to the supporting structure 38 serves to shift the supporting structure 38 laterally relative to the mast 24. As is conventional in forklift trucks, this permits laterally aligning the fork 32 and the push-pull unit 34 with a palletized load 42, FIGS. 2 and 5, to be pulled onto the fork 32, or with a location onto which a palletized load 44, FIGS. 3 and 4, is to be pushed from the fork 32. Thus, it is not necessary to laterally position the truck 22 itself accurately.

Figure 6:
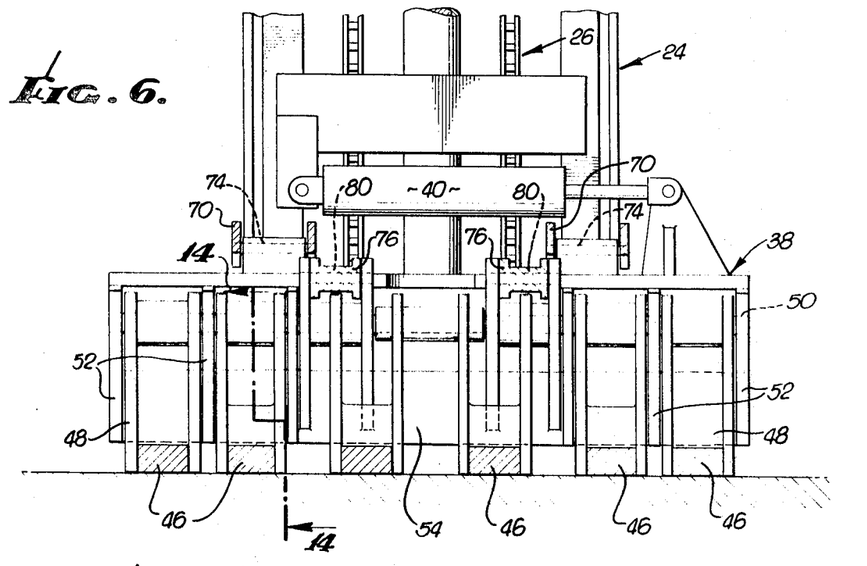
FIGS. 6, 7 and 8 are fragmentary transverse sectional views respectively taken along the arrowed lines 6–6, 7–7 and 8–8 of FIG. 4.

The fork 32 includes laterally spaced tines 46 projecting forwardly from the supporting structure 38 and tapered forwardly in vertical planes substantially from their rearward ends to their forward ends. The tines 46 are generally L-shaped and are provided at their rearward ends with upstanding mounting brackets 48. A transverse horizontal shaft 50 extends through the upper ends of the mounting brackets 48 and through mounting brackets 52, FIG. 6, forming parts of the supporting structure 38 for the fork 32 and the push-pull unit 34. Thus, the shaft 50 provides a transverse horizontal pivot means pivotally connecting the upper ends of the mounting brackets 48 to the supporting structure 38, any tine 46 requiring replacement being readily removable by withdrawing the shaft 50 in one direction or the other far enough to permit disengagement of the corresponding mounting bracket 48 from the corresponding mounting brackets 52.

As will be apparent, the tines 46 are independently pivotable upwardly about the axis of the shaft 50 with the structure hereinbefore described. To limit downward pivoting thereof, the rear sides of the mounting brackets 48 adjacent the lower ends thereof engage a transversely-extending abutment means 54, best shown in FIG. 3, forming part of the supporting structure 38.

Considering the push-pull unit 34, with particular reference to FIGS. 2 to 5, it includes a push-pull assembly or means 56 movable forwardly and rearwardly over the fork 32 along a substantially straight-line path substantially parallel to the downwardly and forwardly sloping upper surfaces of the tines 46, such movement being effected by a push-pull linkage system 58 interconnecting the push-pull assembly 56 and the supporting structure 38. The push-pull linkage system 58 includes three basic components, viz: a four-bar guide linkage 60, mounted on the supporting structure 38 and connected to the push-pull assembly 56, for moving the push-pull assembly along its substantially straight-line path; a four-bar actuating linkage 62, generally of the lazy-tongs type and connected to the guide linkage 60, for moving the push-pull assembly 56 forwardly and rearwardly along its substantially straight-line path; and a four-bar parallel-motion linkage 64 interconnecting the push-pull assembly 56 and the guide linkage 60 for maintaining the push-pull assembly parallel to itself as it is moved back and forth along its substantially straight-line path. The push-pull linkage system 58 also includes actuating means 66, acting on the actuating linkage 62, for extending and contracting the actuating linkage to forwardly extend and rearwardly retract the push-pull assembly 56. In addition, the push-pull linkage system 58 includes a stabilizing linkage 68, interconnecting the push-pull assembly 56 and the guide linkage 60, for bracing the push-pull assembly 56 as it pushes the palletized load 44 forwardly along the tines 46.

Considering the guide linkage 60 with reference to FIGS. 1 to 5 of the drawings, it includes two laterally spaced, parallel, first guide links 70 rigidly interconnected by cross members 72 and 73. The guide links 70 are pivotally connected by transverse pivots 74 to the supporting structure 38. Generally parallel to the first guide links 70, and located forwardly of and below the first guide links, are two laterally spaced, parallel, second guide links 76. The second guide links 76 are pivotally connected to the supporting structure 38 by transverse pivots 80 spaced from the transverse pivots 74, the portion of the supporting structure between the pivots 74 and 80 constituting one bar or link of the four-bar guide linkage 60.

Continuing to consider the guide linkage 60, it includes laterally spaced, parallel, first push-pull links 82 having free, forward ends pivotally connected to the push-pull assembly 56 by transverse pivots 84. The other ends of the first push-pull links 82 are connected to the first and second guide links 70 and 76 by spaced transverse pivots 86 and 88, respectively, the portions of the first push-pull links 82 between the pivots 86 and 88 forming the fourth link or bar of the four-bar guide linkage 60. As the first and second guide links 70 and 76 are pivoted forwardly and rearwardly about the pivots 74 and 80, through the range of positions shown in FIGS. 2 to 5 of the drawings, the free, forward ends of the first push-pull links 82 are moved forwardly and rearwardly along a substantially straight-line path substantially parallel to the downwardly and forwardly sloping upper surfaces of the tines 46.

Figure 12:
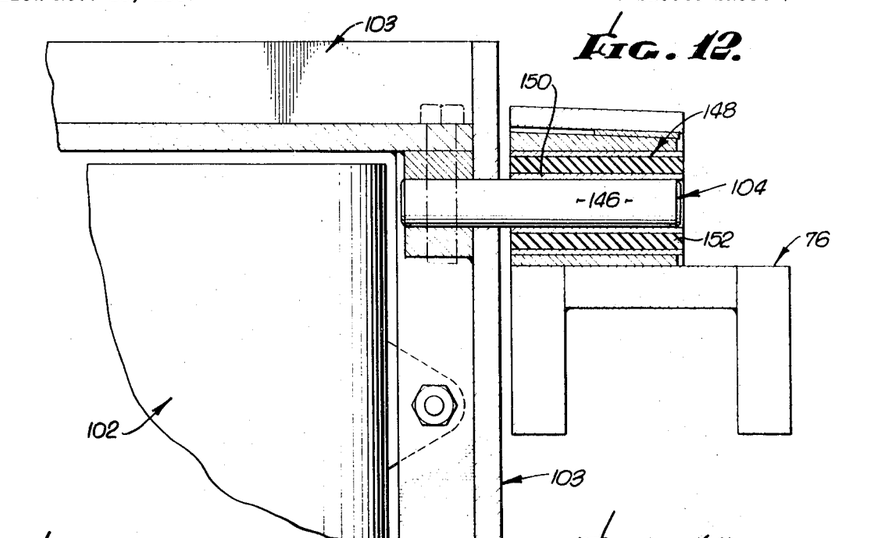
FIGS. 12 and 13 are enlarged, fragmentary sectional views respectively taken along the arrowed lines 12–12 and 13–13 of FIG. 5.

Considering the actuating linkage 62, it includes laterally spaced, parallel, first actuating links 90 having ends respectively connected to the first push-pull links 82 intermediate the ends of the latter by transverse pivots 92, the other ends of the first actuating links being rigidly interconnected by a cross member 94. A transverse pivot 96 adjacent the cross member 94 connects the corresponding ends of the first actuating links 90 to one arm of a bell crank 98. A transverse pivot 100 pivotally connects an intermediate point on the bell crank 98 to one end of a second actuating link 102 mounted in a yoke 103 which is connected to the second guide links 76 by transverse pivots 104, as best shown in FIG. 12. The second actuating link 102 consists of an extensible and contractible actuator, preferably a hydraulic motor of the reciprocating type. It will be noted that the third and fourth bars or links of the four-bar actuating linkage 62 are respectively formed by the portions of the first push-pull links 82 between the pivots 88 and 92 and the portions of the second guide links 76 between the pivots 88 and 104.

The actuating means 66 associated with the actuating linkage 62 includes the hydraulic motor 102. It further includes another extensible and contractible actuator, also preferably a hydraulic motor 106 of the reciprocating type, which extends generally diagonally between the upper and lower corners of the four-bar actuating linkage 62. More particularly, the hydraulic motor 106 is connected at its lower end to the other arm of the bell crank 98 by a transverse pivot 108. The other end of the hydraulic motor 106 is connected to the upper, forward ends of the first guide links 70 by transverse pivots 110 spaced upwardly and forwardly from the pivots 86.

Considering the manner in which the actuating means 66 extends and contracts the actuating linkage 62 to forwardly extend and rearwardly retract the forward, free ends of the first push-pull links 82, it is convenient to begin with the parts in the postitions shown in FIG. 2 of the drawings. Under such conditions, the hydraulic motor 102 is fully contracted and the hydraulic motor 106 is fully extended. Hydraulic fluid under pressure is supplied to the hydraulic motors 102 and 106, in any suitable manner, in directions to tend to extend the hydraulic motor 102 and to contract the hydraulic motor 106. As shown in FIG. 3, initially the hydraulic motor 102 extends, with relatively little contraction of the hydraulic motor 106. This starts the extension of the actuating linkage 62, beginning to extend it forwardly out of the completely contracted position of FIG. 2, wherein the various pivots 88, 92, 96 and 104 are substantially in "dead center" positions. After the hydraulic motor 102 has fully extended, the hydraulic motor 106 contracts to its minimum length, thereby completing the extension of the actuating linkage 62, and displacing the forward, free ends of the first push-pull links 82 forwardly to their forwardmost position, as shown in FIG. 4 of the drawings.

Figure 5:
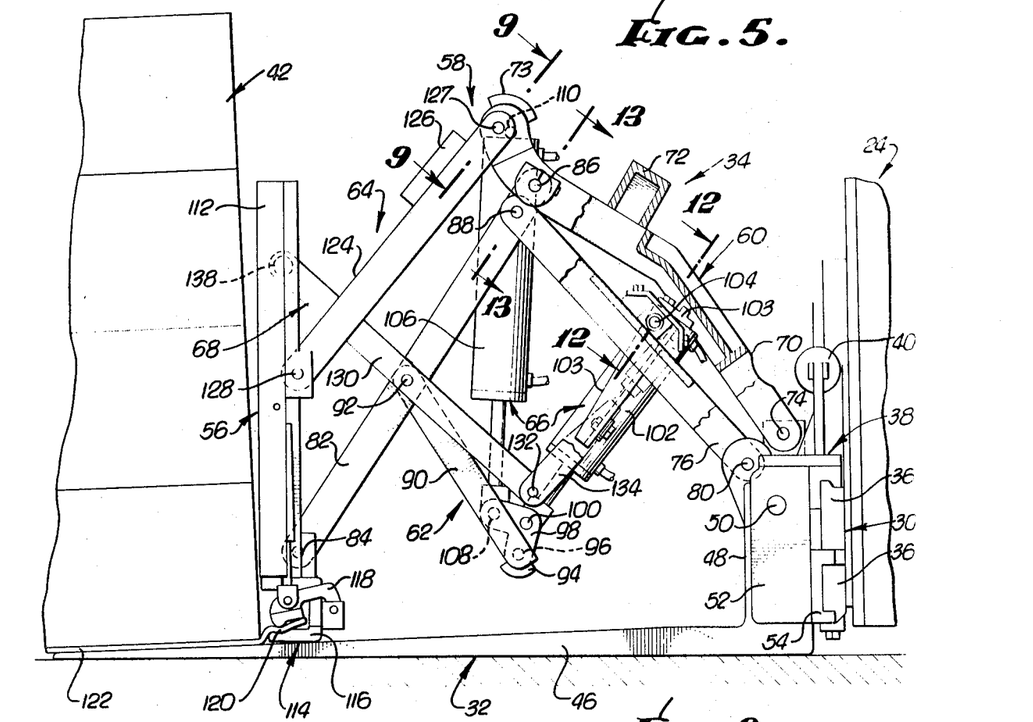
FIG. 5 is a view similar to FIGS. 2, 3 and 4, but showing the push-pull linkage system in a partially contracted condition and in the process of being further contracted.

In contracting the actuating linkage 62 to retract the free, forward ends of the push-pull links 82 rearwardly from their forwardmost positions of FIG. 4 to their rearwardmost positions of FIG. 2, the foregoing sequence of operations is essentially reversed. More particularly, as shown in FIG. 5, hydraulic fluid under pressure is supplied to the hydraulic motors 102 and 106 in directions to contract the hydraulic motor 102 and extend the hydraulic motor 106. As shown in FIG. 5, the hydraulic motor 102 contracts to its minimum length before the hydraulic motor 106 extends to its maximum length.

Figure 10:
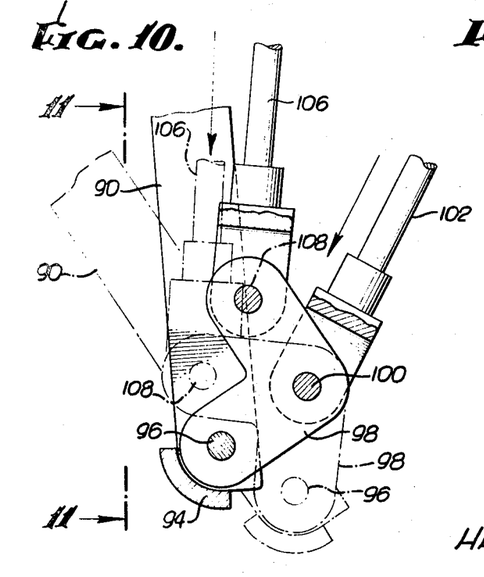
FIG. 10 is a view, partially in section and partially in elevation, showing on an enlarged scale a pivotal interconnecting means which is visible in FIGS. 2, 3, 4 and 5.
Figure 11:
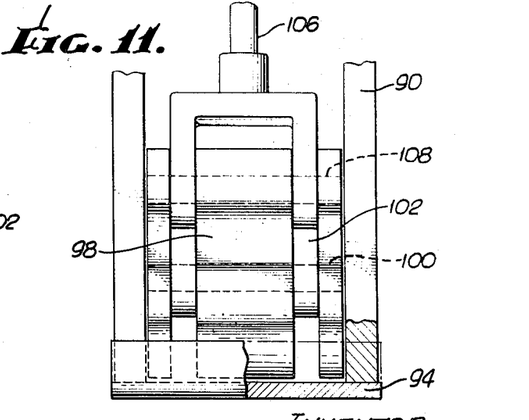
FIG. 11 is a view taken as indicated by the arrowed line 11–11 of FIG 10.

During extension of the actuating linkage 62 to displace the free, forward ends of the first push-pull links 82 forwardly, the forces applied to the bell crank 98 by the hydraulic motors 102 and 106 pivot the bell crank clockwise into the position shown in FIGS. 3 and 4 and in solid lines in FIG. 10. This results in displacement of the pivot 100 out of the substantially dead center position it occupied when the actuating linkage 62 was fully contracted, thereby permitting the hydraulic motor 102 to extend without overstressing any parts. Conversely, during contraction of the actuating linkage 62 to retract the forward, free ends of the first push-pull links 82 rearwardly, the forces applied to the bell crank 98 by the hydraulic motors 102 and 106 bias the bell crank counterclockwise into the position shown in FIGS. 2 and 5 and in broken lines in FIG. 10, to achieve maximum compactness when the actuating linkage is again fully contracted.

Figure 7:
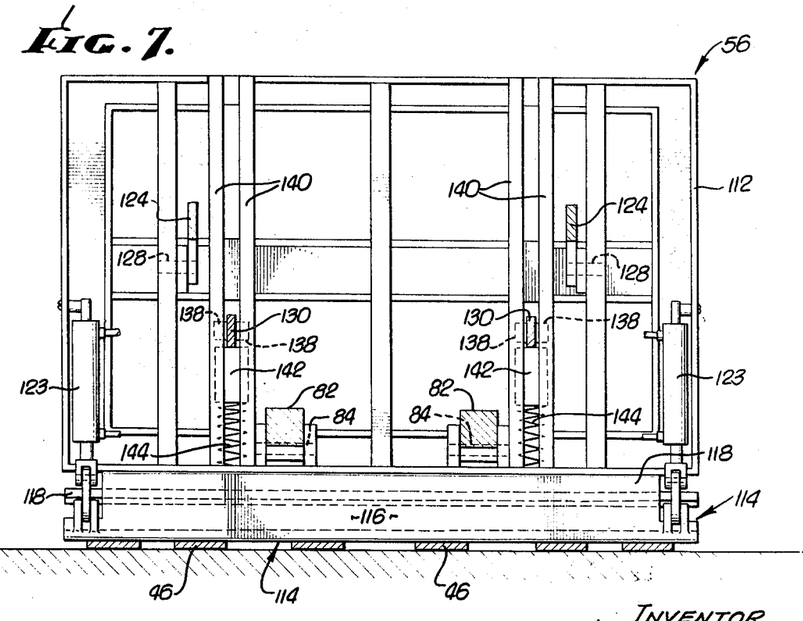
Figure 8:
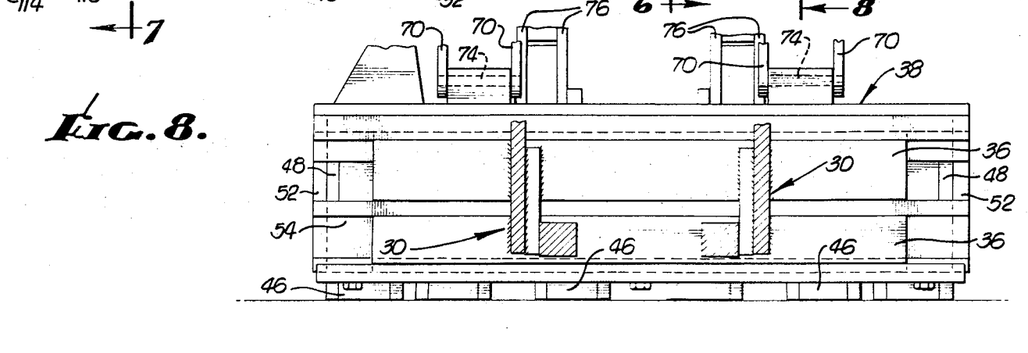

The push-pull assembly 56 comprises a pusher frame 112 which is engageable with the palletized load 44 to push it off the fork 32, as best shown in FIGS. 3 and 4. The pivots 84 connect the free, forward ends of the first push-pull links 82 to the pusher frame 112 adjacent the bottom thereof. Carried by and located below the pusher frame 112 is a pulling means 114 which also forms part of the push-pull assembly 56. As best shown in FIG. 5, the pulling means 114 includes fixed and movable clamp jaws 116 and 118 engageable with an exposed edge 120 of a sheet-like pallet 122 on which the palletized load 42 is stacked. The fixed jaw 116 is insertable under the exposed pallet edge 120 while the movable jaw 118 is engageable with the upper side of the exposed pallet edge. As shown in FIG. 7, upright hydraulic motors 123 of the reciprocating type interconnect the movable jaw 118 and the pusher frame 112 to move the movable jaw 118 into and out of clamping engagement with the upper side of the exposed pallet edge 120.

Considering the parallel-motion linkage 64, it includes the first push-pull links 82, and also includes laterally spaced, parallel, second push-pull links 124 generally parallel to the first and rigidly interconnected by a cross member 126. The rear ends of the second push-pull links 124 are connected to the forward ends of the first guide links 70 by transverse pivots 127 adjacent the pivots 110. The forward ends of the second push-pull links 124 are connected to the pusher frame 112 by transverse pivots 128 spaced upwardly from the pivots 84. The third and fourth bars or links of the four-bar parallel-motion linkage 64 are formed by the portions of the first guide links 70 between the pivots 86 and 127 and the portions of the pusher frame 112 between the pivots 84 and 128. As will be apparent, the parallel-motion linkage 64 maintains the pusher frame 112 in parallel positions as it is moved forwardly and rearwardly.

The stabilizing linkage 68 includes parallel, laterally spaced links 130 pivotally connected intermediate their ends to the first push-pull links 82 by the pivots 92. The rearward ends of the links 130 are pivotally connected by transverse pivots 132 to links 134 which, in turn, are pivotally connected to intermediate points on the second guide links 76 by transverse pivots 136. The links 130 are provided at their forward ends with rollers 138 movable upwardly and downwardly in upright tracks 140 on the pusher frame 112. The forward ends of the links 130 are biased upwardly by spring followers 142 which are movable upwardly and downwardly along the tracks 140 and which are biased upwardly by compression springs 144. As previously explained, the stabilizing linkage 68 serves to brace the push-pull assembly 56, and particularly the pusher frame 112 during initial extension of the push-pull assembly, as best shown in FIG. 3.

Considering some of the features of and results achieved with the push-pull unit 34 of the invention, it will be apparent from FIG. 2 of the drawings that the push-pull unit is extremely compact and occupies relatively little space when fully contracted to retract the push-pull assembly 56. This compactness when contracted is achieved by moving the pivots associated with the actuating linkage 62 and the actuating means 66 nearly into vertical alignment so that these components are virtually on "dead center." The guide linkage 60, the parallel-motion linkage 64 and the stabilizing linkage 68 are similarly contracted into extremely compact positions.

On the other hand, as will be apparent by comparing FIGS. 2 and 4 of the drawings, when the push-pull linkage system 58 is fully extended, as shown in FIG. 4, it has a very substantial reach to render it capable of handling palletized or other loads having dimensions in the push-pull direction of several feet.

The foregoing compactness when contracted and long reach when extended are achieved with a push-pull linkage system 58 having a relatively few links or bars, many of the links or bars being common to the three basic linkages, viz., the guide linkage 60, the actuating linkage 62 and the parallel-motion linkage 64. For example, the first push-pull links 82 form a major component of all three of these linkages. Consequently, since the number of links or bars used is relatively small, they can be of heavy and sturdy construction, thereby rendering the push-pull linkage system 58 capable of handling heavy loads without danger of breakage of any of the parts thereof.

Figure 9:
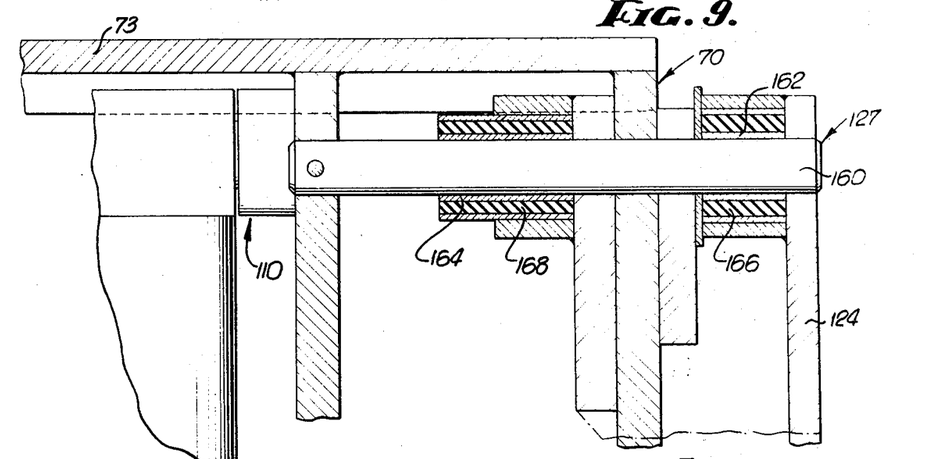
FIG. 9 is an enlarged, fragmentary sectional view taken as indicated by the arrowed line 9–9 of FIG. 5.
Figure 13:
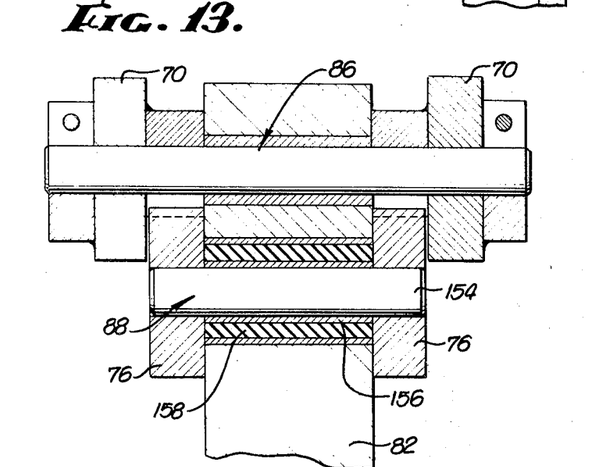
Figure 14:
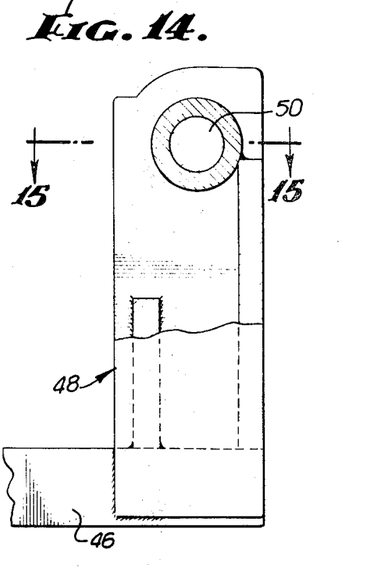
FIG. 14 is an enlarged, fragmentary sectional view taken as indicated by the arrowed line 14—14 of FIG. 6.
Figure 15:
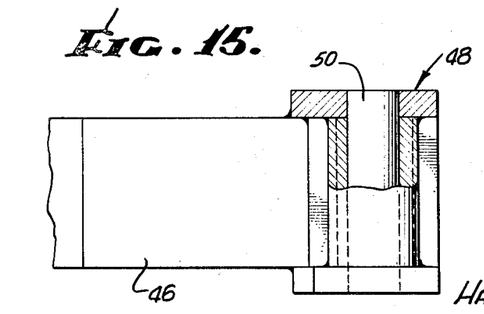
FIG. 15 is a fragmentary sectional view taken as indicated by the arrowed line 15—15 of FIG. 14.

Another feature of the invention is that various of the pivots incorporated in the push-pull linkage system 58 are yieldable to insure that the loads imposed on the linkage system are properly distributed among the various components thereof, i.e., to insure against inadvertently applying an excessive load to any one component. FIGS. 9, 12 and 13 of the drawings illustrate preferred ways of achieving this result.

Referring to FIG. 12, illustrated therein in detail is one of the transverse pivots 104 pivotally connecting one side of the yoke 103 for the hydraulic motor 102 to the corresponding second guide link 76. The pivot 104 includes a pivot pin 146 carried by the yoke 103 and pivotable in a pivot bearing assembly 148 suitably secured to the corresponding second guide link 76. The pivot bearing assembly 148 includes an inner bearing 150 in which the pivot pin 146 is journalled, and which is surrounded by an elastomeric sleeve 152. The elastomeric sleeve 152 permits yielding of the pivot 104 to insure proper load distribution, as hereinbefore indicated.

In FIG. 13 of the drawings, one of the pivots 88 is shown as having a similar construction. More particularly, it includes a pivot pin 154 journalled in an inner bearing 156 which is mounted in an elastomeric sleeve 158. This construction permits the pivot 88 to yield to permit relative movement, other than relative pivotal movement, of the corresponding second guide link 76 and the corresponding first push-pull link 82 for proper load distributing purposes.

Turning to FIG. 9, the pivots 127 have a construction similar to the pivots 104 and 88. More specifically, each pivot 127 includes a pivot pin 160 journalled in inner bearings 162 and 164 respectively mounted on the corresponding second push-pull links 124 and first guide links 70 by means of elastomeric sleeves 166 and 168. With this construction, the pivots 127 can yield to permit relative movement between the links 70 and 124 other than relative pivotal movement.

Similar yieldable pivots may be employed in other places in the push-pull linkage system 58 if necessary for proper load distribution throughout the various bars or links.

Although an exemplary embodiment of the invention has been disclosed herein for purposes of illustration, it will be understood that various changes, modifications and substitutions may be incorporated in such embodiment without departing from the spirit of the invention as defined by the claims appearing in the next section of this specification.

I claim as my invention:

1. In a push-pull linkage system, the combination of:
   (a) a support;
   (b) a push-pull link;
   (c) means interconnecting said push-pull link and said support for guiding one end of said push-pull link toward and away from said support along a substantially straight-line path, said guiding means comprising a four-bar linkage which includes generally parallel first and second guide links pivotally connected to said support in laterally spaced relation and pivotally connected to the other end of said push-pull link in laterally spaced relation; and
   (d) actuating means interconnecting said push-pull link and said guiding means for moving said one end of said push-pull link toward and away from said support along said substantially straight-line path.

2. A push-pull linkage system according to claim 1 wherein said actuating means includes:
   (a) a first actuating link pivotally connected at one end to said push-pull link intermediate the ends of the latter;
   (b) a second actuating link pivotally connected at one end to said second guide link intermediate the ends of the latter;
   (c) means pivotally interconnecting the other ends of said first and second actuating links;
   (d) said first and second actuating links cooperating with said push-pull link and said second guide link form a four-bar lazy-tongs linkage;
   (e) an extensible and contractible actuator;
   (f) means pivotally connecting one end of said actuator to said lazy-tongs linkage adjacent the corner thereof formed by said first and second actuating links;

(g) means pivotally connecting the other end of said acutator to said lazy-tongs linkage adjacent the diagonally opposite corner thereof; and (h) whereby extension and contraction of said actuator respectively result in contraction and extension of said lazy-tongs linkage to move said one end of said push-pull link respectively toward and away from the said support along said substantially straight-line path.

3. A push-pull linkage system as set forth in claim 2 wherein said second actuating link comprises a second extensible and contractible actuator.

4. A push-pull linkage system as defined in claim 3 including:

(a) push-pull means pivotally connected to said one end of said push-pull link so as to be movable therewith back and forth along said substantially straight-line path toward and away from said support in response to contraction and extension of said lazy-tongs linkage;

(b) a four-bar parallel-motion linkage interconnecting said push-pull means and said guiding means for maintaining said push-pull means parallel to itself as it is moved back and forth along said substantially straight-line path; and (c) said parallel-motion linkage including said push-pull link and a second push-pull link generally parallel thereto, one end of said second push-pull link being pivotally connected to said push-pull means at a point spaced spaced laterally from said one end of the first-mentioned push-pull link, and the other end of said second push-pull link being pivotally connected to said first guide link at a point spaced laterally from said other end of said first-mentioned push-pull link.

5. A push-pull linkage system according to claim 4 wherein said push-pull means includes:

(a) pushing means engageable with a load to push same away from said support in response to extension of said lazy-tongs linkage; and (b) clamping means engageable with a load to pull same toward said support in response to contraction of said lazy-tongs linkage.

6. In a push-pull linkage system, the combination of:

(a) a four-bar lazy-tongs linkage comprising four pivotally interconnected links of which is extensible and contractible; and (b) an extensible and contractible actuator extending generally diagonally of said lazy-tongs linkage and pivotally connected thereto adjacent the corresponding diagonally opposite corners thereof.

7. In a push-pull linkage system, the combination of:

(a) a four-bay lazy-tongs linkage comprising a support, a push-pull link having a movable end and having its other end pivotally connected to said support, a first actuating link pivotally connected at one end to said push-pull link intermediate the ends of the latter, and a second actuating link pivotally connected at one end to said support, said lazy-tongs linkage further including means pivotally interconnecting the other ends of said first and second actuating links;

(b) said second actuating link being extensible and contractible;

(c) an extensible and contractible actuator;

(d) means pivotally connecting one end of said actuator to said lazy-tongs linkage adjacent the corner thereof formed by said first actuating link and said extensible and contractible, second actuating link;

(e) means pivotally connecting the other end of said actuator to said lazy-tongs linkage adjacent the diagonally opposite corner thereof; and (f) whereby extension and contraction of said actuator respectively result in contraction and extension of said lazy-tongs linkage to move said movable end of said push-pull link generally toward and away from said support.

8. A push-pull linkage system as set forth in claim 7 including means for extending said second actuating link and contracting said actuator and for contracting said second actuating link and extending said actuator.

9. A push-pull linkage system according to claim 8 wherein said second actuating link and said actuator are reciprocating fluid motors.

10. A push-pull linkage system as defined in claim 7 including a connector located at the first-mentioned corner of said lazy-tongs linkage, said other ends of said first and second actuating links and said one end of said actuator being piovtally secured to said connector in spaced-apart relation.

References Cited

UNITED STATES PATENTS

| | | | |
|---|---|---|---|
| 2,533,980 | 12/1950 | Weaver | 254—122 X |
| 3,110,476 | 11/1963 | Farris | 254—122 |
| 3,117,765 | 1/1964 | Chiuzzi | 254—10.6 |
| 3,203,670 | 8/1965 | Farris | 254—122 |

ROBERT C. RIORDON, Primary Examiner

D. R. MELTON, Assistant Examiner

U.S. Cl. X.R.

74—521; 214—512; 254—8

PO-1050
(5/69)

UNITED STATES PATENT OFFICE
CERTIFICATE OF CORRECTION

Patent No. 3,516,641          Dated June 23, 1970

Inventor(s) Kenneth F. Ferguson

It is certified that error appears in the above-identified patent and that said Letters Patent are hereby corrected as shown below:

Column 3, line 8, after "linkage" insert --system wherein the parallel motion linkage comprises--

Column 8, line 72, after "link" insert --to--

Column 9, line 33, "spaced" second occurrence should be deleted     Column 10, line 1, "four-bay" should be --four-bar--

SIGNED AND
SEALED
SEP 29 1970

(SEAL)
Attest:

Edward M. Fletcher, Jr.
Attesting Officer

WILLIAM E. SCHUYLER, JR.
Commissioner of Patents